United States Patent [19]
Chiang et al.

[11] Patent Number: 5,515,107
[45] Date of Patent: May 7, 1996

[54] METHOD OF ENCODING A STREAM OF MOTION PICTURE DATA

[75] Inventors: Chen-Huei Chiang, Sunnyvale; Yann LeComec, Fremont, both of Calif.

[73] Assignee: Sigma Designs, Incorporated, Fremont, Calif.

[21] Appl. No.: 220,713

[22] Filed: Mar. 30, 1994

[51] Int. Cl.$^6$ ................................ H04N 7/04; H04N 7/12
[52] U.S. Cl. .................... 348/473; 348/423; 348/426; 348/461
[58] Field of Search ................................ 348/384, 423, 348/426, 461, 464, 462, 467, 465, 466, 469, 470, 495, 439, 440, 17

[56] References Cited

U.S. PATENT DOCUMENTS

| | | | |
|---|---|---|---|
| 5,111,292 | 5/1992 | Joseph et al. | 348/423 |
| 5,122,875 | 6/1992 | Raychaudhuri et al. | 348/419 |
| 5,168,356 | 12/1992 | Acampora | 348/423 |
| 5,231,492 | 7/1993 | Dangi et al. | 348/17 |
| 5,289,276 | 2/1994 | Siracusa et al. | 348/469 |

*Primary Examiner*—Victor R. Kostak
*Attorney, Agent, or Firm*—D'Alessandro & Ritchie

[57] ABSTRACT

Methods of encoding and decoding data in variable-length data structures, such as that found in motion picture data. Data in an MPEG standard format may be encoded in a format which is not easily subject to unauthorized copying, but which may be easily displayed in a real-time video and audio display. The encoded data may be less subject to errors in data distribution and data storage than known methods of data transformation. Encoded data may be multiplexed with non-encoded data, or may be multiplexed with data encoded by another technique, in such manner that recovery of the original motion picture video and audio may still be achieved in real time. The degree of encoding may take on differing values, so that, for example, all motion picture data is encoded for one video clip, while only some of data is encoded for a second video clip.

8 Claims, 8 Drawing Sheets

METHOD OF ENCODING A STREAM OF MOTION PICTURE DATA

BACKGROUND OF THE INVENTION

1. Field of the Invention

This invention relates to methods of encoding data such as found in motion picture video and audio.

2. Description of Related Art

The desire to distribute and display motion pictures in digital form, such as by means of a computer system, has led to the development of the MPEG ("Motion Pictures Experts Group") standards for motion picture video data. The MPEG standards prescribe a set of variable-length structures for encoding motion picture video and audio data, which may be read by and interpreted by a digital processor so as to display motion pictures. The MPEG standards have the advantage of providing substantial data compression of motion picture video data. However, the MPEG standards do not provide a convenient and effective method for encoding motion picture video and audio data so that such data cannot easily be copied by unauthorized persons.

Known methods of encoding data so that unauthorized persons cannot copy that data generally involve manipulating the data by a transformation, so that a password or key is required to perform a necessary inverse transformation, so as to obtain the original data. While these methods achieve security of the data, they are generally subject to certain drawbacks. (1) Errors in data distribution, or in data storage, may render the transformed data useless, because the inverse transformation is unable to recover the original data. (2) The transformation may be ill-suited to data structures which have variable length. In the case of the MPEG standards, the large amount of data involved may transform these drawbacks into serious engineering issues. First, the large amount of data greatly increases the likelihood that there will be at least some errors in distribution or in data storage. Second, the MPEG standards provide for data fields which are highly interdependent.

Accordingly, it is an object of the invention to provide methods of encoding data in variable-length data structures, such as those found in motion picture data, in which the encoded data may be difficult for unauthorized persons to copy, but in which the encoded data is easily decoded and displayed in a real-time video and audio display, and in which the encoded data is less subject to errors in data distribution or data storage.

SUMMARY OF THE INVENTION

The invention provides methods of encoding and decoding data in variable-length data structures, such as that found in motion picture data. In a preferred embodiment, data in a standard format may be encoded in a format which is not easily subject to unauthorized copying, but which may be easily decoded and displayed in a real-time video and audio display. In a preferred embodiment, the encoded data may be less subject to errors in data distribution and data storage than known methods of data transformation.

In a preferred embodiment, encoded data may be multiplexed with non-encoded data, or may be multiplexed with data encoded by another technique, in such manner that recovery of the original motion picture video and audio may still be achieved in real time. For example, motion picture video data may be encoded while motion picture audio data remains in a non-encoded form, or while motion picture audio data is encoded by an alternative technique.

In a preferred embodiment, the degree of encoding may take on differing values, so that, for example, all motion picture data is encoded for one video clip, while only some of data is encoded for a second video clip. This allows users of the invention to determine independently the degree of their need to prevent copying and whether that need is sufficient to require additional processing power to encode and decode data.

DESCRIPTION OF THE PREFERRED EMBODIMENT

The invention may be understood in conjunction with the MPEG I specification for motion picture video and audio data, ISO/IEC Draft International Standard CD 11172, described in more detail in the ISO/IEC JTC 1/SAC 29 N specification, dated Dec. 6, 1991, hereby incorporated by reference as if fully set forth herein.

The invention may also be understood in conjunction with a data format description shown herein.

The invention may be used in conjunction with a digital computer system comprising a processor, memory, and mass storage, such as an IBM compatible PC, having an Intel 386 processor operating at 25 MHz, or better, with at least 2 MB of RAM and at least 2 MB of space free on a magnetic disk drive. Such systems are well known in the art. Those skilled in the art would readily understand, after perusal of this application, that the methods and techniques described for operation on a processor would be readily implemented on such a digital computer system without undue experimentation. Accordingly, detailed description of computer programing techniques or methods of implementation are not set forth herein, except where such techniques or methods are specific to the invention.

ENCODING AND DECODING SYSTEM

Figure 1:
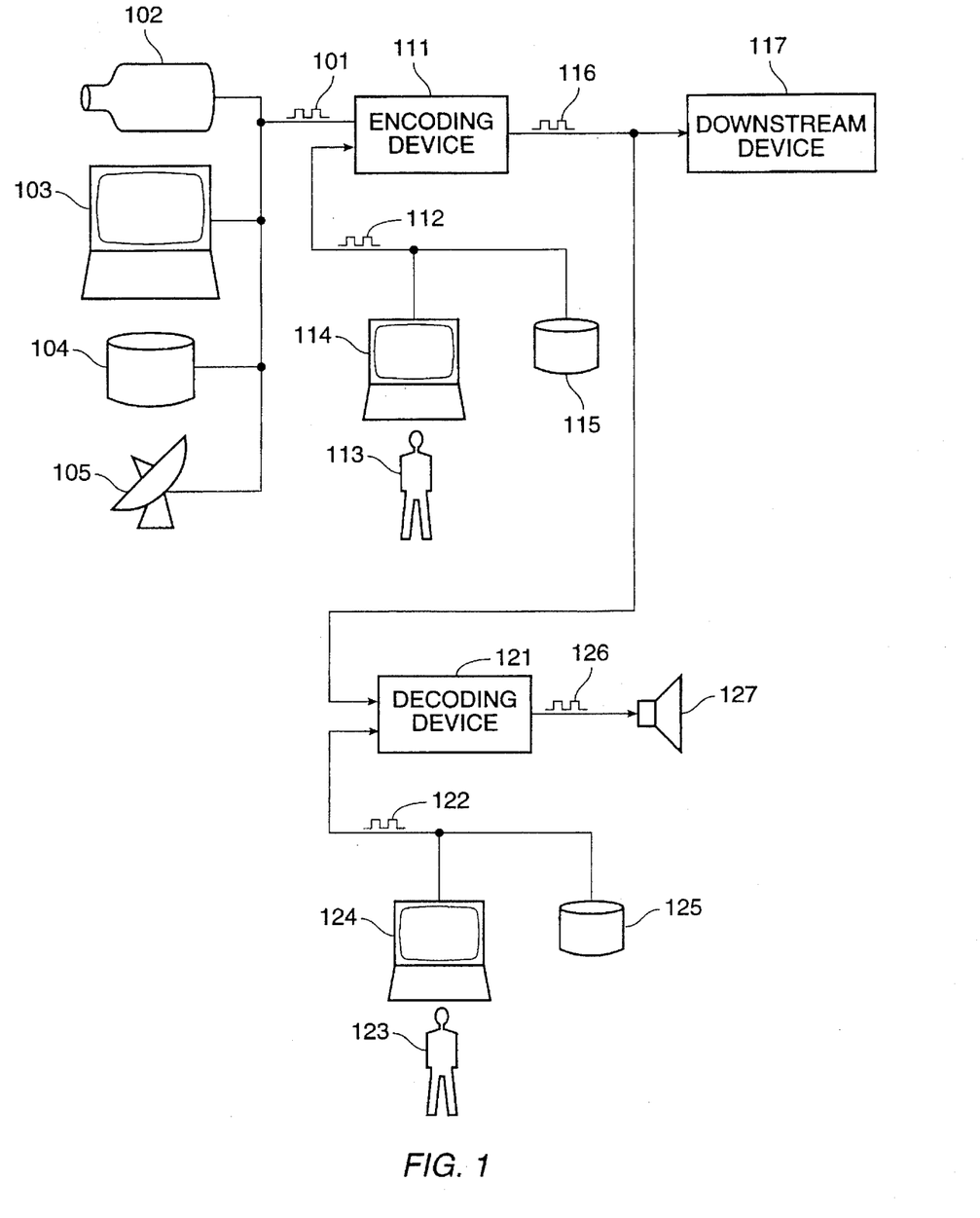
FIG. 1 shows a block diagram of a motion picture video and audio data encoding and decoding system.

FIG. 1 shows a block diagram of a motion picture video and audio data encoding and decoding system.

A stream of motion picture data 101 may be collected from a motion picture camera 102, from a motion picture editing device 103 (such as a workstation computer having a processor, memory and mass storage), from a storage medium 104 (such as a magnetic disk or CD-ROM), from a transmission medium receiving device 105 (such as a microwave or satellite receiving dish), or from another source (such as by composition of still picture data).

In a preferred embodiment, the motion picture data 101 may comprise data in a known video format, such as NTSC, PAL, SECAM, RGB, or another format. In such known video formats, the motion picture data 101 may comprise a plurality of streams of analog or digital data, as is known in the art. For example, in NTSC, the motion picture data 101 may comprise Y, I and Q data, while in RGB, the motion picture data 101 may comprise R, G, and B data.

The motion picture data 104 may be coupled to an input port of an encoding device 111, which may also input a set of encoding parameters 112. The encoding parameters 112 may be generated by an operator 113 by means of an input device 114 (such as a keyboard or a pointing device), or may be retrieved from a storage medium 115. In response to the motion picture data 101 and the encoding parameters 112, the encoding device 111 may produce a stream of encoded data 116, as further described herein.

In a preferred embodiment, the encoding device 111 may comprise a processor, program memory, and working memory, with one or more input ports for receiving the motion picture data 101, one or more input ports for receiving the encoding parameters 112, and one or more output ports for transmitting the encoded data 116 to a downstream device 117 (such as a storage medium or a transmission medium sending device).

In a preferred embodiment, the encoding parameters 112 may comprise at least one parameter indicating a level of encoding which is to be performed on the motion picture data 101, which should have at least one value indicating that no encoding should be performed other than to encode the motion picture data 101 into the ISO 11172 format.

In a preferred embodiment, the encoding parameters 112 may comprise at least one parameter indicating a parameter of the decoded data 126 signal to be produced by a decoding device 121. For example, the encoding parameters 112 may comprise a value for a frame rate or a set of values for a picture size (line rate per frame, pixel rate per line) to be produced by a decoding device 121.

In a preferred embodiment, the encoded data 116 may comprise data in ISO 11172 ("MPEG I") standard format, or may comprise data which has been further encoded for decoding into ISO 11172 standard format. The ISO 11172 standard allows for data to be formatted in a stream of video data, a stream of audio data, or a multiplexed stream of both video and audio data.

The encoded data 116 may be transmitted by known means to an input port of a decoding device 121. These known means may comprise a broadcast mechanism, such as over-air broadcast, cable TV broadcast, or closed-circuit TV transmission, may comprise a distribution mechanism, such as transfer of bulk information by means of magnetic tape or compact disk, or may comprise another mechanism, such as transfer over a communication network.

The decoding device 121 may also input a set of decoding parameters 122. The decoding parameters 122 may be generated by an operator 123 by means of an input device 124, may be retrieved from a storage medium 125, or from another source, or may be derived from aspects of the encoded data 116. The latter source for the decoding parameters 122 is preferred. In response to the encoded data 116 and the decoding parameters 122, the decoding device 121 may produce a stream of decoded data 126, as further described herein.

In a preferred embodiment, the decoding device 121 may comprise a processor, program memory, and working memory, with one or more input ports for receiving the encoded data 116, one or more input ports for receiving the decoding parameters 122, and one or more output ports for transmitting the decoded data 126 to a downstream device 127 (such as a storage medium, a transmission medium sending device, or a display device).

In a preferred embodiment, the decoded data 126 may comprise data in a known video format, such as NTSC, PAL, SECAM, RGB, or another format. The decoded data 126 may be produced for display on a computer system monitor, in which case the RGB format is preferred, or for display on a television monitor, in which case the NTSC format is preferred in the United States.

As noted herein, in a preferred embodiment the encoding parameters 112 may comprise at least one parameter indicating a parameter of the decoded data 126 signal to be produced by a decoding device 121. It may therefore occur that the decoded data 126 may comprise a data in a video format which differs from the video format of the motion picture data 101, e.g., in frame rate or picture size. The decoded data 126 may further comprise a different format from the motion picture data 101, e.g., one may be in NTSC format while the other is in RGB format. In a preferred embodiment, the decoding device 121 may have a plurality of output ports for decoded data 126 having differing formats.

In a preferred embodiment, the motion picture data 101 may be transferred from its original capture device to a storage medium such as CD-ROM, in which form it may be coupled to the encoding device 111 and encoded for distribution. The encoded data 116 may be coupled to and stored in a storage device such as CD-ROM for distribution, in which form it may be coupled to the decoding device 121 and decoded for direct display to a human audience. In a preferred embodiment, the decoding device 121 may comprise an add-in board for a desktop computer system, and may comprise an input/output port for coupling to a computer system bus (such input/output ports are well known in the art), on-board processor and memory.

ENCODING VIDEO DATA

Figure 2:
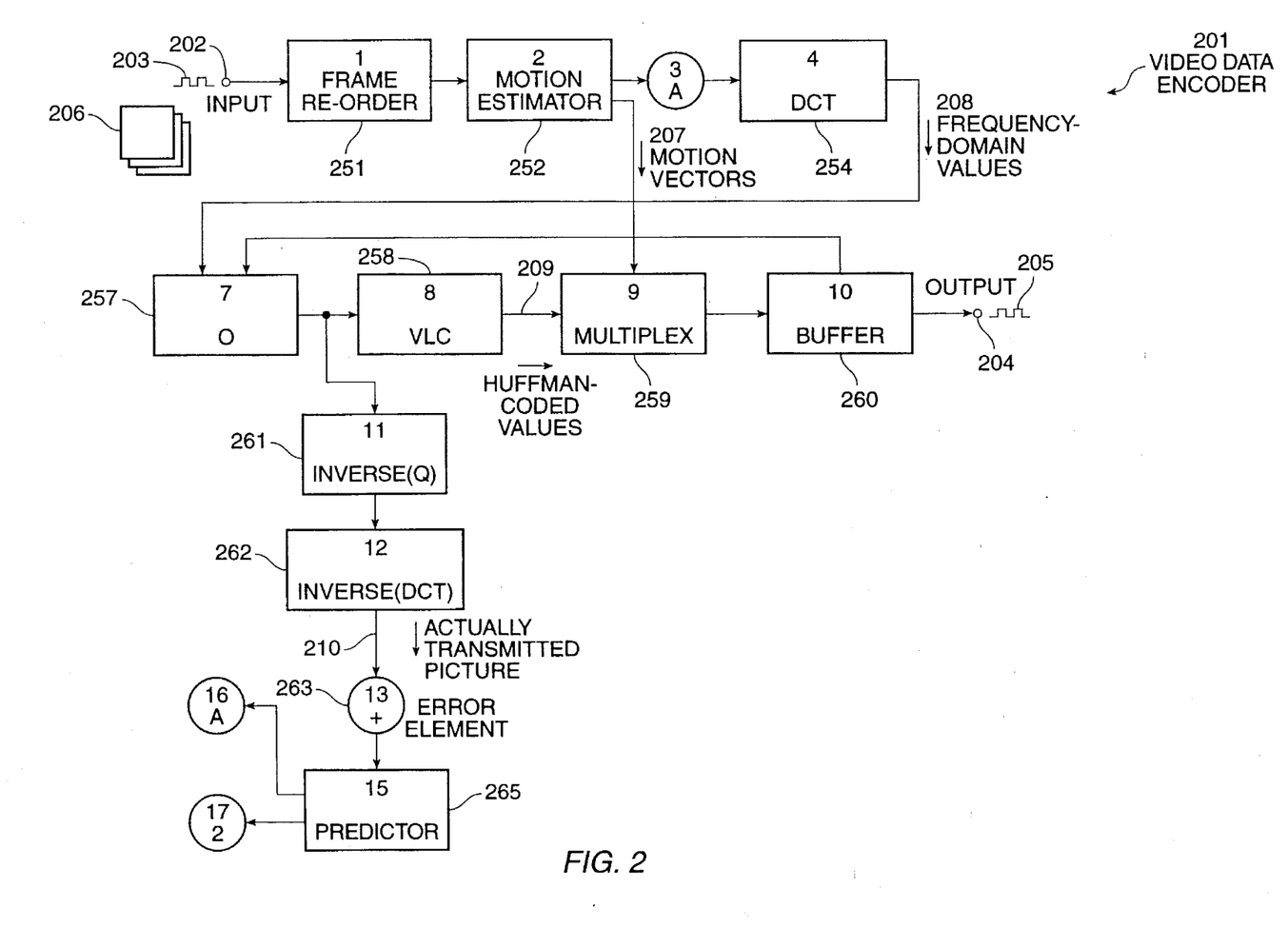
FIG. 2 shows a block diagram of a motion picture video data encoder.

FIG. 2 shows a block diagram of a motion picture video data encoder.

A video data encoder 201 may comprise an input port 202 for receiving a stream of motion picture video data 203 and an output port 204 for transmitting a stream of encoded video 205. The stream of motion picture data 101 may comprise the stream of motion picture video data 203, and may be coupled to the input port 202 of the video data encoder 201. The stream of motion picture video data 203 may comprise a stream of video frames 206, such as a stream of still video frames 206 which may be generated by a video camera, or other equivalent video recording equipment.

The input port 202 may be coupled to a frame re-order element 251, which may reorder the stream of video frames 206 to comply with the ISO 11172 format. As each video frame 206 is input, it is assigned to be encoded as an I frame, a P frame or a B frame, as provided by the ISO 11172 format.

Figure 2A:
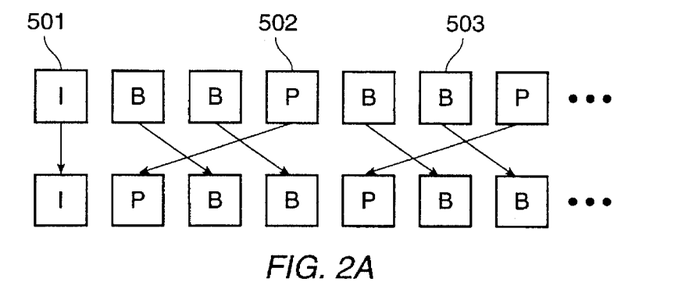
FIG. 2A shows an example re-ordering operation which may be performed by the frame re-order element 251.

FIG. 2A shows an example re-ordering operation which may be performed by the frame re-order element 251.

The ISO 11172 format generally prescribes that the stream of video frames 206 may comprise video frames of several types. "I" frames 501 occur periodically, generally about one per ½ second (e.g., each 15 frames in video having 30 frames per second, but they could be each 10 frames, each 20 frames, or have some other period). Each I frame describes a picture standing alone. "P" frames 502 also occur periodically (about 4 per I frame, but they could be 3 per I frame, 5 per I frame, or some other ratio). Each P frame describes a picture as it may differ from the most recent I or P frame. "B" frames 503 also occur periodically (about 1–4 per single I frame or P frame, but they could occur with a different ratio, or could be skipped entirely). Each B frame describes a picture as it may differ from its surrounding I frame and P frame. Other frame types are not generally used by the present invention.

It will be clear to those skilled in the art, after perusal of this application, that assignment of each frame as an I, P, or B frame is not rigidly based on the count of frames in a video sequence. Although the first frame in a video sequence must generally comprise an I frame 501, the assignment of frames may differ in differing groups of pictures. For example, the first group of pictures may comprise an additional P frame 502 immediately after the first I frame 501. The assignment of frames may also differ in response to differing characteristics of a sequence of pictures. For example, a first sequence (or group of pictures) may comprise one B frame 503 between each pair of P frames 502, while a second sequence (or group of pictures) may comprise two B frames 503 between each pair of P frames 502.

| group | example frame sequence |
|---|---|
| 0 | I P B B P B B . . . P B B |
| 1 | I B B P B B P B B . . . P B B |

The frame re-order element 251 may be coupled to a motion estimator 252, which may perform motion estimation as described herein.

The ISO 11172 format generally prescribes that each "video sequence" (a sequence of video frames 206) may comprise a set of "groups of pictures", which may each comprise a set of "pictures" (a single frame), which may each comprise a set of "slices", which may each comprise a set of "macroblocks", which may each comprise a set of 2×2 "blocks", which may each comprise a set of 8×8 pixels. Motion estimation may take the form of noting a macroblock and indicating that it appears in a set of related frames. Effectively the format may provide that the same information from <frame X, macroblock Y> is repeated, with minor changes, in <frame X+m, macroblock Z>.

Figure 2B:
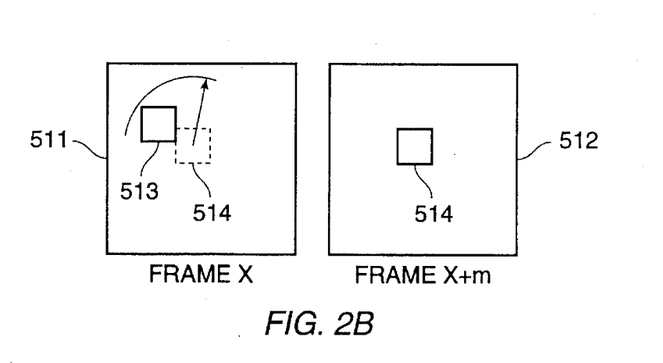
FIG. 2B shows an example motion-estimation operation which may be performed by the motion estimator 252.

FIG. 3B shows an example motion-estimation operation which may be performed by the motion estimator 252.

In a preferred embodiment, the motion estimator 252 may compare a first frame 511 (e.g., a frame X, possibly an "I" frame) with a second frame 512 (e.g., a frame X+m, possibly a "P" frame). The motion estimator 252 may examine a macroblock 513 in frame X 511 (a "source" macroblock) and search for a macroblock 514 in frame X+m 512 (a "target" macroblock) which is similar to the source macroblock 513. The motion estimator 252 may repeat this task for each source macroblock 513 in frame X 511.

In a preferred embodiment, the motion estimator 252 may examine only those target macroblocks 514 which are within a motion estimation range 515 of the position of the source macroblock 513. Among those target macroblocks 514 that are within this motion estimation range 515, the motion estimator 252 may compute a measurement of matching between the source macroblock and the target macroblock. In a preferred embodiment, this measurement may comprise a weighted sum of the absolute differences between corresponding pixels in the source macroblock 513 and the target macroblock 514:

$$\frac{\Sigma |\text{macroblackA} - \text{macroblockB}|}{\text{standard deviation of macroblockA}}$$

In a preferred embodiment, the motion estimator 252 may search for a best matching target macroblock 514 and determine a motion vector 207 between the source macroblock 513 and the target macroblock 514 comprising a movement distance and a movement direction (or a source macroblock and a target macroblock). In a preferred embodiment, the motion vector 207 should be computed only when the best matching target macroblock 514 exceeds a minimum acceptable match value.

In a preferred embodiment, the motion estimator 252 may be coupled to an output of a reconstruction element 265 (which may compute a reconstructed picture, as described herein), and an error may be computed therefrom. The error may represent a difference between the current picture as described by the motion estimator 252, i.e., the previous picture as transformed by motion vectors 207, and the previous picture as described by the reconstruction element 265. The error may therefore be a value such as (I*-P) or (P*-P), for a P frame, or (I*-B), (P*-B), or ((I*+P*)/2-B), for a B frame, where I* and P* represent frames after transformation by motion vectors 207. The error may be coupled to a DCT element 254, which may perform a discrete cosine transform as prescribed by the ISO 11172 format, and may generate a set of frequency-domain values 208.

The DCT element 254 may be coupled to a quantizor 257, which may scale and quantize the frequency-domain values 208 determined by the DCT element 254. In a preferred embodiment, the quantizor 257 may be responsive to frequency-domain values 208 in a number of preceding frames, which may be recorded in a buffer 260.

In a preferred embodiment, the quantizor 257 may perform three steps (1) target bit allocation, (2) rate control, and (3) adaptive quantization.

In target bit allocation, the quantizor 257 may estimate the number of bits available to code the picture. First, the quantizor 257 may estimate the picture's complexity. In a preferred embodiment, the picture's complexity may be computed as $Xi = Si \, Qi$ (for an I frame), where Xi is a measure of the picture's complexity, Si is the number of bits generated by encoding the picture, and Qi is the average quantization value (i.e., the average of actual quantization values for all macroblocks in this picture, including skipped macroblocks).

The picture's complexity for a P frame $Xp = Sp \, Qp$, or for a B frame $Xb = Sb \, Qb$, may be computed in a similar manner. Initially, $Xi = 160/115$ of the bit rate (in bits/second), $Xp = 60/115$ of the bit rate, and $Xb = 42/115$ of the bit rate.

Second, the quantizor 257 may compute a target number of bits for the group of pictures which includes the picture. In a preferred embodiment, a target number of bits Ti, Tp, Tb (for an I, P or B frame) may be computed as follows:

$$Ti = \max\left(\frac{R}{1 + \frac{Np\,Xp}{Xi\,Kp} + \frac{Nb\,Xb}{Xi\,Kb}}, \frac{\text{bit rate}}{8 * \text{picture rate}}\right)$$

$$Tp = \max\left(\frac{R}{Np + \frac{Np\,Kp\,Xb}{Kb\,Xp}}, \frac{\text{bit rate}}{8 * \text{picture rate}}\right)$$

$$Tb = \max\left(\frac{R}{Nb + \frac{Np\,Kb\,Xp}{Kp\,Xb}}, \frac{\text{bit rate}}{8 * \text{picture rate}}\right)$$

where Kp and Kb are constants which depend on the quantization matrices; in a preferred embodiment, Kp=1.0 and Kb= 1.4;

where R is the number of bits assigned to the group of pictures; R is set to 0 at the start of a video sequence, R is set to G+R at the start of a group of pictures (G=number of pictures in the group of pictures * bit rate/picture rate), R is decremented after each picture by the number of bits used to encode that picture; and where Np is the number of P frames remaining in the group of pictures and Nb is the number of B frames remaining in the group of pictures.

In rate control, the quantizor 257 may control the quantization rate. First, the quantizor 257 may compute a fullness value for the buffer 260 (separate buffers 260 may be maintained for I, P and B frames). In a preferred embodiment, a fullness value, before encoding the jth macroblock, d(j)i, d(j)p, d(j)b (for an I, P or B frame) may be computed as follows:

d(j)i=d(0)i+B(j-1) Ti(j-1)/MB_count where d(0)i=fullness value before 0th macroblock, i.e., at start;

where B(j-1)=number of bits generated after encoding all macroblocks including the (j-1)st; and where MB_count=number of macroblocks in the picture.

The final value d(MB count)i may be used as d(0)i for the next picture.

Fullness values d(j)p and d(j)b may be computed in a similar manner.

Second, the quantizor 257 may compute a reference quantization value Qj (for macroblock j)=31d(j)/r, where r is a reaction parameter, r=2 bit rate/picture rate. In a preferred embodiment, the initial values d(0)i=10r/31, d(0)p=Kp d(0)i, d(0)p=Kb d(0)i.

In adaptive quantization, the quantizor 257 may compute a quantization value for each macroblock. First, the quantizor 257 may compute a spatial activity measure (for the jth macroblock). In a preferred embodiment, a spatial activity measure may be activity(j)=1+minimum(variance (subblock)), where variance(subblock) may comprise the variance of pixel values for four luminance frame-organized subblocks and four luminance field-organized subblocks (i.e., the luminance values of the four blocks that comprise the macroblock for the picture and the luminance values of the four blocks that comprise the macroblock for one frame of the picture).

Second, the quantizor 257 may compute a normalized activity measure (for the jth macroblock). In a preferred embodiment, a normalized measure may be computed as follows:

$$\text{normalized activity}(j) = \frac{2\,\text{activity}(j) + (\text{mean activity})}{\text{activity}(j) + 2\,(\text{mean activity})}$$

Third, the quantizor 257 may compute an actual quantization value mQj (for macroblock j)=Qj * (normalized activity(j)). The actual quantization value mQj should always be less than or equal to 31 and greater than or equal to 2.

The quantizor 257 may be coupled to a variable-length coding element 258, which may generate a variable-length coded description of the quantized frequency-domain values 208. In a preferred embodiment, the variable-length coding element 258 may use Huffman coding or a similar information-theoretic method for representing information in a relatively small number of bits, and may generate a set of Huffman-coded values 209.

The variable-length coding element 258 may be coupled to a multiplexor 259, which may multiplex the motion vectors 207 determined by the motion estimator 252 and the Huffman-coded values 209 determined by the variable-length coding element 258.

The multiplexor 259 may be coupled to a buffer 260, which may buffer information produced by the multiplexor 259, and which may be coupled to the output port 204. As noted herein, the buffer 260 may also be coupled to the quantizor 257.

The quantizor 257 may also be coupled to an inverse quantizor 261, which may substantially invert the operation performed by the quantizor 257.

The inverse quantizor 261 may be coupled to an inverse DCT element 262, which may perform an inverse discrete cosine transform, thus substantially inverting the operation performed by the DCT element 254. The combined operation of the inverse quantizor 261 and the inverse DCT element 262 provide an indication of the actually transmitted picture 210.

The inverse DCT element 262 may be coupled to an error element 263, which may compute a difference between the frame 206 and the actually transmitted picture 210. The error element 263 may be coupled to a reconstruction element 265, which may determine a reconstructed picture 211, and which may be coupled to the motion estimator 252.

ENCODING AUDIO DATA

Figure 3:
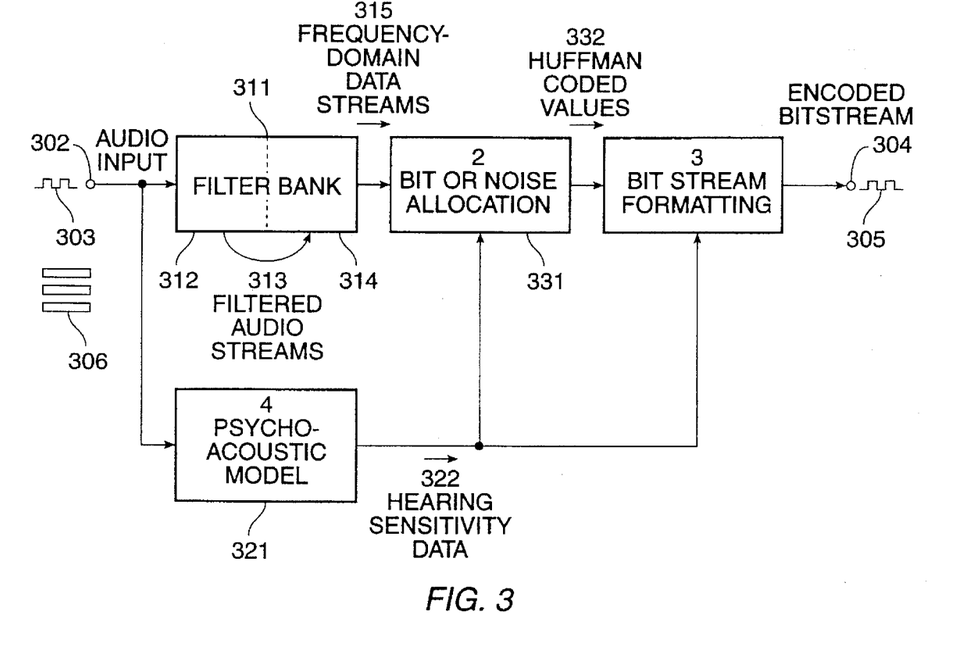
FIG. 3 shows a block diagram of a motion picture audio data encoder.

FIG. 3 shows a block diagram of a motion picture audio data encoder.

An audio data encoder 301 may comprise an input port 302 for receiving a stream of motion picture audio data 303 and an output port 304 for transmitting a stream of encoded audio 305. The stream of motion picture data 101 may comprise the stream of motion picture audio data 303, and may be coupled to the input port 302 of the audio data encoder 301. The stream of motion picture audio data 303 may comprise a stream of audio volume data 306, such as a stream of instantaneous audio volume data 306 as may be generated by a microphone and A/D converter, or other equivalent sound recording equipment.

The input port 302 may be coupled to a filter bank 311, which may comprise a set of bandpass filters 312, each tuned to a relatively narrow frequency range, and collectively covering a normal hearing range. The bandpass filters 312 may filter the stream of audio data 306 into a set of filtered audio data streams 313, one for each frequency range, and each represented as a stream of audio volume data in a time domain.

The filter bank 311 may also comprise a frequency transform element 314, which may input time slices of the filtered audio data streams 313, as output from the bandpass filters 312. A time slice of the filtered audio data streams 313 may comprise a set of single values from each filtered audio data stream 313. The frequency transform element 314 may perform a frequency transform on that time slice of data, such as a discrete cosine transform (DCT), and may generate a set of frequency-domain data streams 315. In a preferred embodiment, there may be 32 bandpass filters 312 and the frequency element 314 may perform a DCT on the filtered audio data streams 313.

In a preferred embodiment, the filter bank 311 may comprise a set of coefficients which may be multiplied by the stream of audio data to produce a stream of output data; the set of coefficients may be selected so as to cause both the filtering effect of the bandpass filters 312 and the frequency-transform effect of the frequency transform element 314 to occur in the same operation.

The input port 302 may also be coupled to a psychoacoustic model element 321, which may determine a set of hearing sensitivity data 322 for the frequency ranges operated on by the filter element 311. The psychoacoustic model element 321 may comprise a set of coefficients for enhancing or degrading the volume of the audio data at each frequency in response to the set of hearing sensitivity data.

The frequency-domain data streams 315 may be coupled to a bit allocation element 331, which may determine a number of bits to allocate to each frequency range, in response to the frequency-domain data streams 315 and the hearing sensitivity data 322. In a preferred embodiment, values in the frequency-domain data streams 315 may be multiplied by values in the hearing sensitivity data 322, and the product encoded by an information-theoretic compression process such as Huffman coding, to generate a set of Huffman-coded values 332.

The Huffman-coded values 332 may be coupled to a bit-stream formatting element 341, which may, in response to the hearing sensitivity data 322 and the Huffman-coded values 332, multiplex the Huffman-coded values 332 into a single data stream 333 and may format that data stream as prescribed by the ISO 11172 format.

ENCODING THE MOTION PICTURE DATA

Figure 4A:
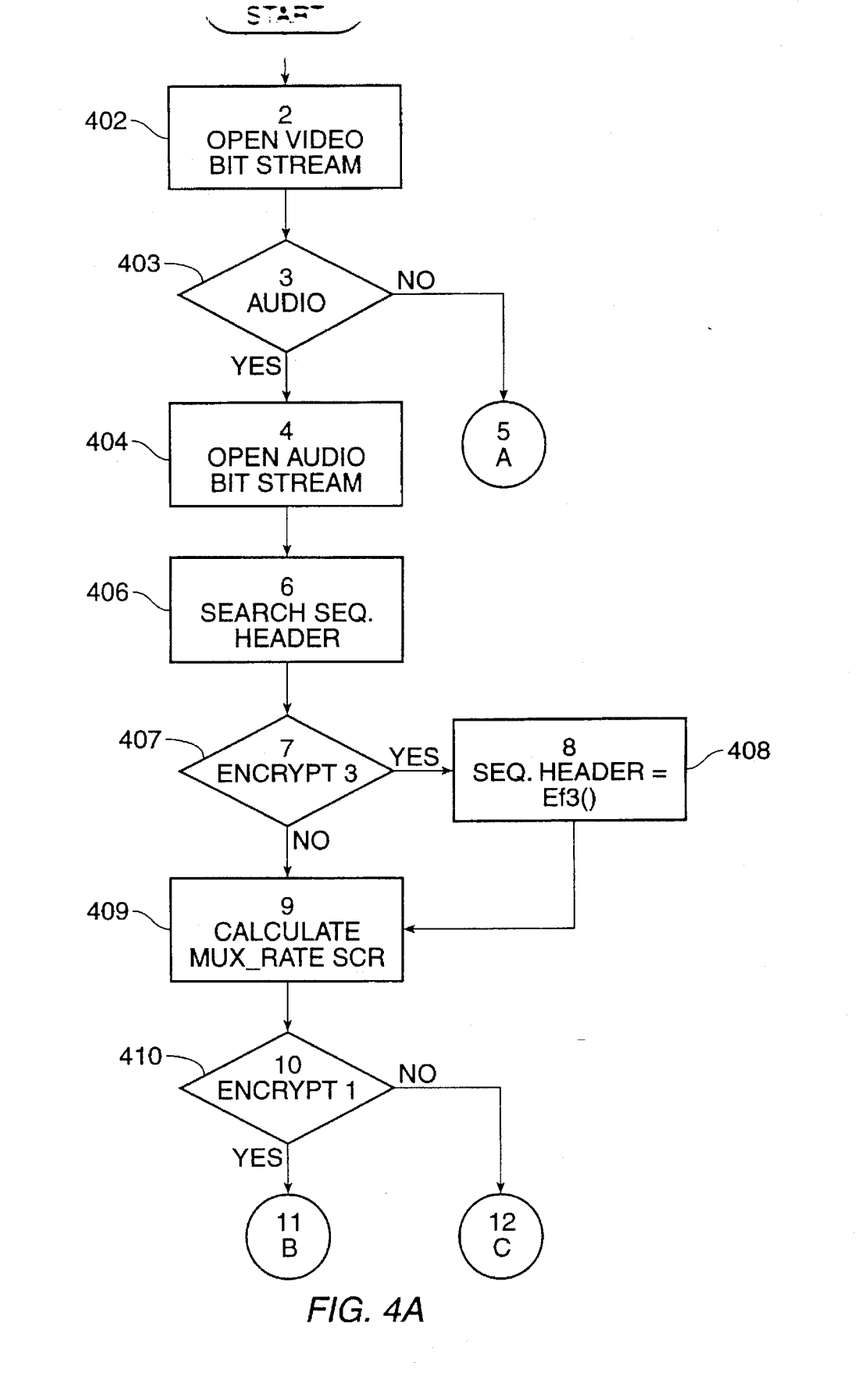
FIGS. 4A–4D show a process flow diagram of a method of encoding motion picture data.
Figure 4B:
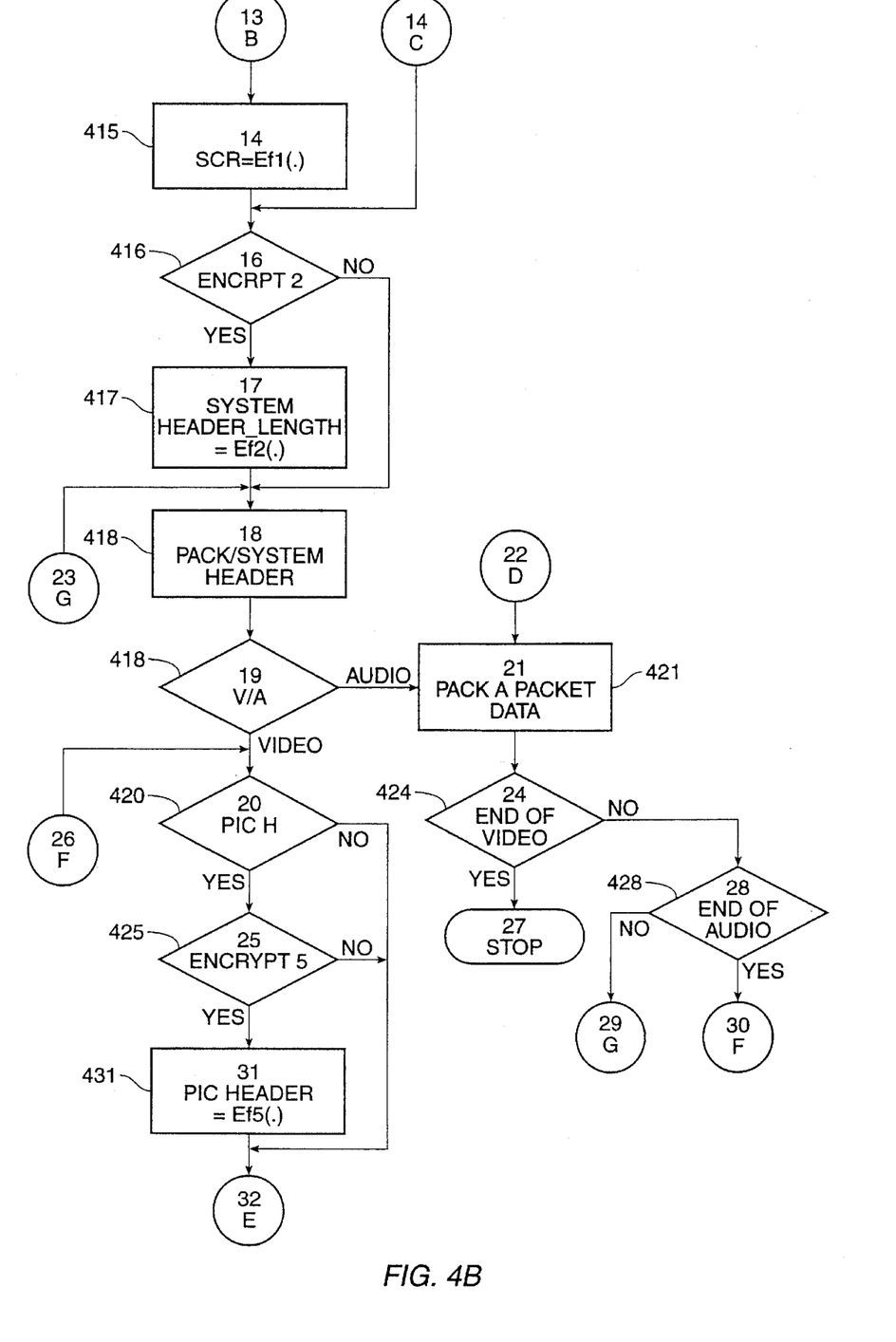

FIG. 4A shows a process flow diagram of a method of encoding motion picture data. FIG. 4B shows a data structure diagram for encoding motion picture data.

Figure 4C:
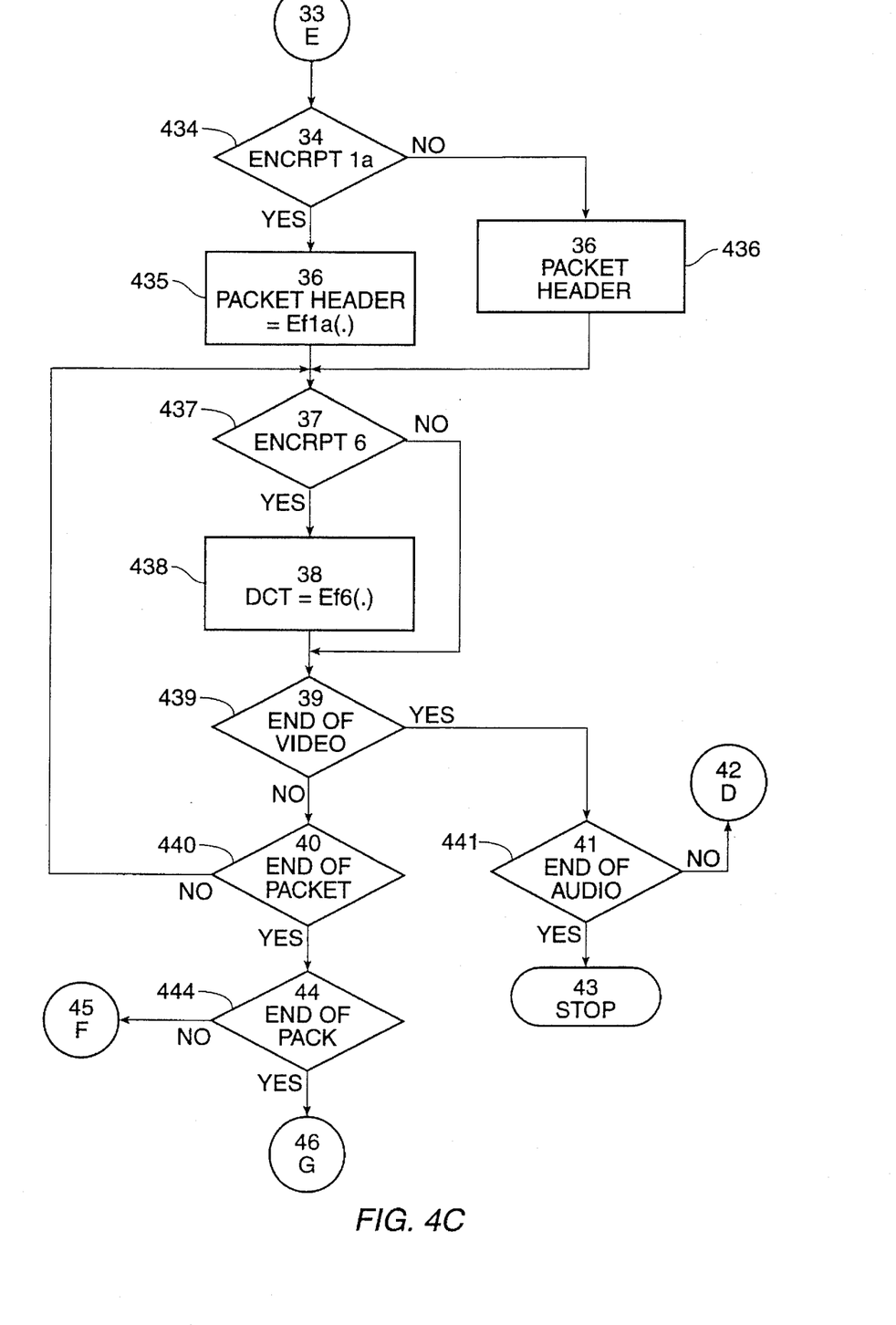
Figure 4D:
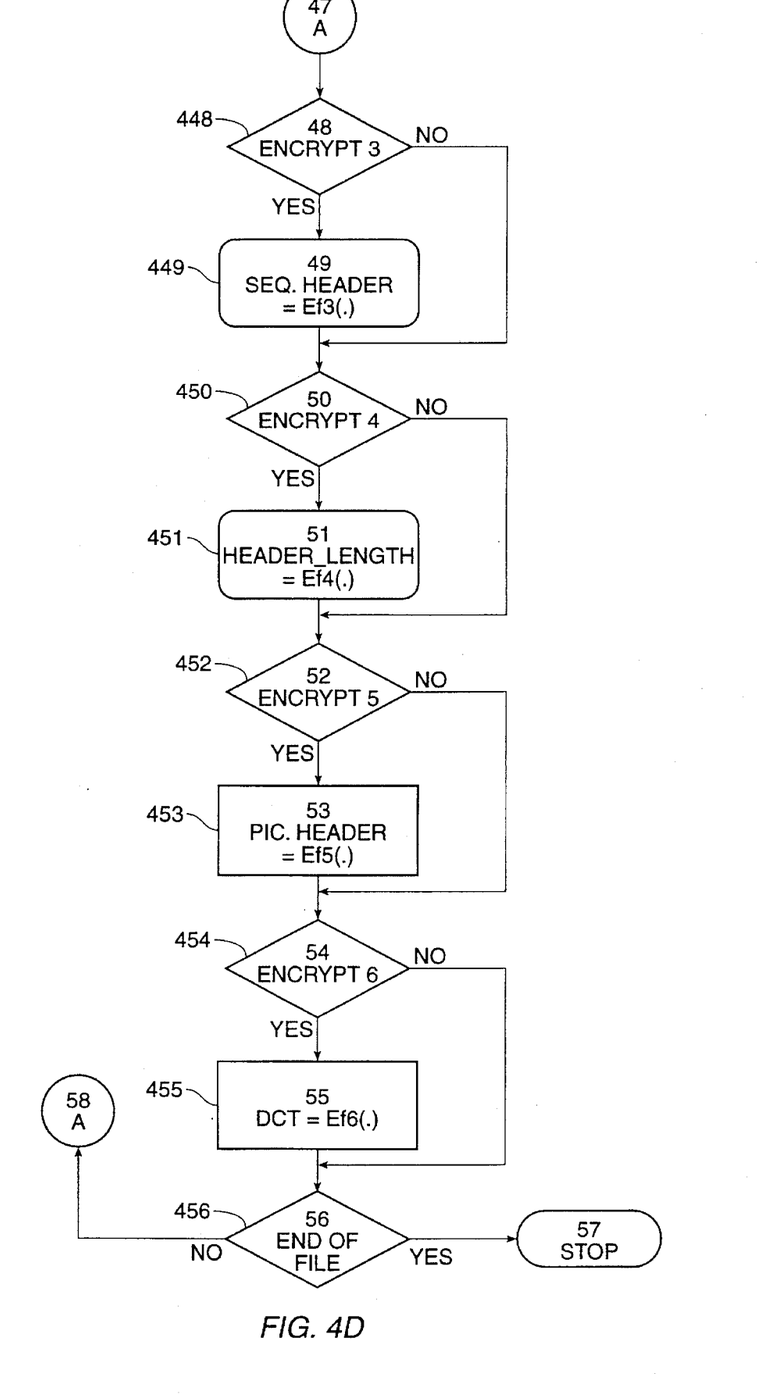
Figure 4E:
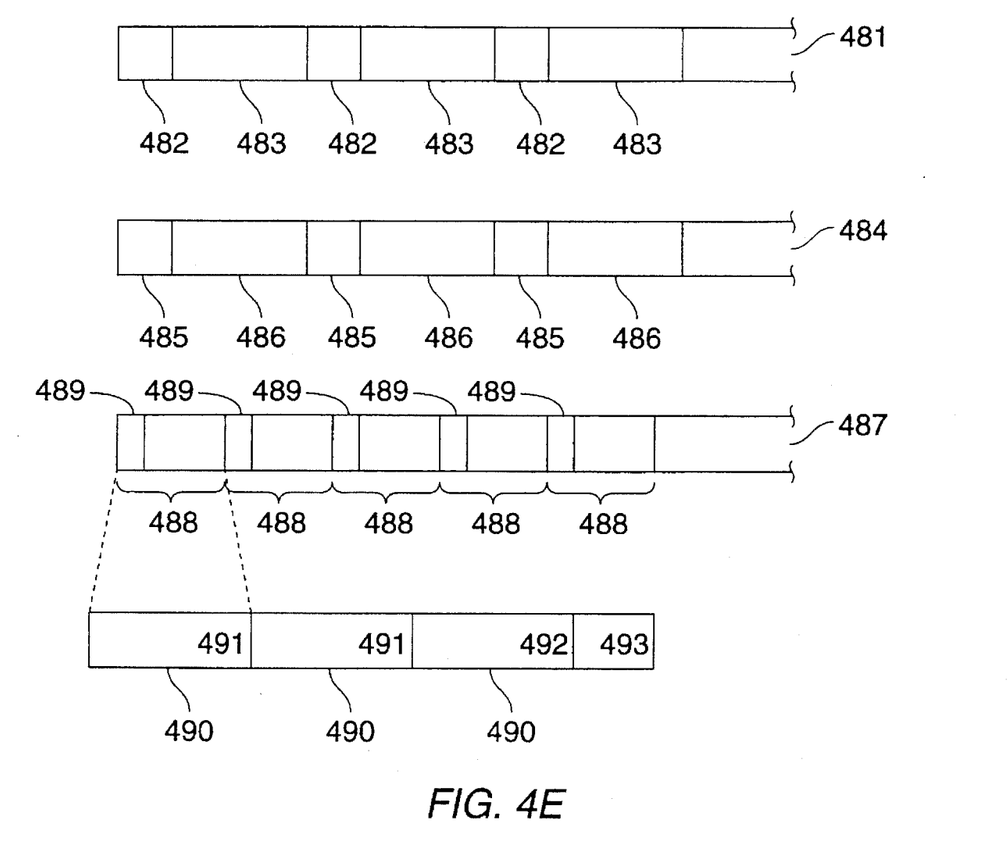
FIG. 4E shows a data structure diagram of motion picture data for encoding.

In a preferred embodiment, video data 481 may comprise a first multilayered data structure, described in more detail in a data format description shown herein, which may comprise video header information 482 and DCT block information 483. As described in the data format description, video header information 482 may comprise header information for a sequence of pictures, header information for a group of pictures, header information for a picture, header information for a slice, header information for a macroblock, header information for a block, and motion vectors. DCT block information 483 may comprise a set of DCT coefficients.

In a preferred embodiment, audio data 484 may comprise a second multilayered data structure, described in more detail in a data format description shown herein, which may comprise audio header information 485 and audio block information 486. Audio block information 486 may comprise a data stream 333 as described herein.

In a preferred embodiment, video data 481 and audio data 484 may be multiplexed in a single data stream 487. The single data stream 487 may comprise a sequence of "packs" 488, each of which may comprise an approximate time unit of video data 481 and a similar approximate time unit of audio data 484, and may also comprise a pack header 489. In this manner, a decoding device 121 may decode and display an approximate time unit of video data 481 without failing to decode and display a similar approximate time unit of audio data 484. In a preferred embodiment, the approximate time unit is about 1/15 second.

In a preferred embodiment, each pack 488 may comprise a set of packets 490, each of which may comprise a video packet 491 or an audio packet 492, and may also comprise a decoding or presentation time-stamp 493, or other parameters. In a preferred embodiment, each packet 489 may comprise a fixed group of data bits (about two kilobytes is preferred), which may comprise the next group of data bits from the video data 481 or the audio data 484.

At step 402, a stream of video data may be located, such as by means of an operating system call to open a file containing the video data.

At step 403, it is determined whether there will be any audio data to encode. If so, the process continues with step 404. Otherwise the process continues at label "A" with step 448.

At step 404, a stream of audio data may be located, such as by means of an operating system call to open a file containing the audio data.

At step 406, a sequence header for the motion picture data is located, such as by searching the motion picture data for the data structure element which comprises the sequence header.

At step 407, it is determined whether an encoding function should be applied to the sequence header. If so, the process continues with step 408, where the sequence header may be encoded with a selected encoding function. The process then continues with step 409.

At step 409, a multiplexing rate between video data and audio data is determined, such as by computing the multiplexing rate in response to the video data rate, the audio data rate, and the desired total data rate.

At step 410, it is determined whether an encoding function should be applied to the multiplexing rate. If so, the process continues at label "B" with step 415, where the multiplexing rate may be encoded with a selected encoding function. The process then continues at label "C" with step 416.

At step 416, it is determined whether an encoding function should be applied to the header-length data item. If so, the process continues with step 417, where the header length may be encoded with a selected encoding function. The process then continues with step 418.

At step 418, a pack header may be located, such as by searching the motion picture data for the data structure element which comprises the pack header.

At step 419, it is determined whether the pack header indicates video or audio data. If video, the process continues with step 420. If audio, the process continues with step 421.

At step 421, a packet of audio data may be packaged, and the process continues with step 424.

At step 424, it is determined whether there is any more video data to be processed. If so, the process continues at label "G" with step 418. Otherwise, the process continues with step 428.

At step 428, it is determined whether there is any more audio data to be processed. If so, the process continues at label "G" with step 418. Otherwise, the process continues at label "F" with step 420.

At step 420, it is determined whether a picture header is present, such as by searching the motion picture data for the data structure element which comprises the picture header, and the process continues with step 425.

At step 425, it is determined whether an encoding function should be applied to the picture header data item. If so, the process continues with step 431, where the picture header may be encoded with a selected encoding function. The process then continues at label "E" with step 434.

At step 434, it is determined whether an encoding function should be applied to the packet header data item. If so, the process continues with step 435, where the packet header may be encoded with a selected encoding function. Otherwise, the process continues with step 436, where the packet header is processed without encoding. The process then continue with step 437.

At step 437, it is determined whether an encoding function should be applied to the DCT data. If so, the process continues with step 438, where the DCT data may be encoded with a selected encoding function. The process then continue with step 439.

At step 439, it is determined whether there is any more video data to be processed. If not, the process continues with step 440. Otherwise, the process continues with step 441.

At step 441, it is determined whether there is any more audio data to be processed. If so, the process continues at label "D" with step 421.

At step 440, it is determined whether there is any more data in the packet. If not, the process continues with step 437. Otherwise the process continues with step 444.

At step 444, it is determined whether there is any more data in the pack. If not, the process continues at label "F" with step 420. Otherwise the process continues at label "G" with step 418.

At step 448, it is determined whether an encoding function should be applied to the sequence header data item. If so, the process continues with step 449, where the sequence header may be encoded with a selected encoding function. The process then continues with step 450.

At step 450, it is determined whether an encoding function should be applied to the header length data item. If so, the process continues with step 451, where the header length may be encoded with a selected encoding function. The process then continues with step 452.

At step 452, it is determined whether an encoding function should be applied to the picture header data item. If so, the process continues with step 453, where the picture header may be encoded with a selected encoding function. The process then continues with step 454.

At step 454, it is determined whether an encoding function should be applied to the DCT data. If so, the process continues with step 455, where the DCT data may be encoded with a selected encoding function. The process then continues with step 456.

At step 456, it is determined whether there is any more data to be processed. If so, the process continues at label "A" with step 448. Otherwise, the process is complete.

SELECTED ENCODING FUNCTIONS

In a preferred embodiment, an ISO 11172 data stream may be encoded in three stages. In a first stage, a picture may be encoded by altering the picture header ("picture_header" in the data format description given herein). If the first stage of selected encoding is applied, a first indicator bit may be set in the frame rate field (in "sequence_header" the "frame_rate" field).

In a preferred embodiment, the frame rate field (in "sequence_header", the "frame_rate" field) may comprise a 4-bit value value, normally in the range from 1 to 7 inclusive. If the first stage of selected encoding is applied, this field may have 8 added to it, thus setting the most significant bit (MSB) and bringing into the range from 9 to 15 inclusive. The first stage of selected encoding may be detected by examining the MSB of this field.

If the first stage of selected encoding is applied, the picture "f code" (in "picture_header" both the "forward_f_code" and the "backward_f_code" fields) may be encoded as follows:

In a first step, the picture temporal reference (in "picture_header", the "temporal_reference" field), a 10-bit value, may be XOR'ed with a 5-bit seed value, right justified in the 10-bit field, and the rightmost 5-bit value may be preserved. The XOR (exclusive or) operation is known in the art. The seed value may be obtained from an operator when the encode is applied and when decoding is applied.

In a second step, the f code may have the result of the first step subtracted from it, and the result decremented one more.

In a third step, the result of the second step may be incremented by 7 repeatedly until it is in the range from 1 to 7, and the result assigned to the f code.

In a second stage, which may be applied in addition to the first stage, the picture's DCT coefficients may be encoded by altering them. Similarly to the first stage, if the second stage of selected encoding is applied, a second indicator bit in the aspect ratio field (in "sequence_header" the "sample_aspect_ratio" field) may be set.

In a preferred embodiment, the aspect ratio field (in "sequence_header" the "sample_aspect ratio" field) may comprise a 4-bit value, normally with its MSB cleared. If the second stage of selected encoding is applied, this field may have 8 added to it, thus setting the MSB. The second stage of selected encoding may be detected by examining the MSB of this field.

The picture's DCT coefficients may be encoded by altering them similarly to the first stage. For example, a part of each DCT coefficient may be XOR'ed with a user seed.

In a third stage, which may be applied in addition to the second stage, additional aspects of the picture or data stream may be encoded. Similarly to the second stage, if the third stage of selected encoding is applied, a third indicator bit in the picture coding field (in "picture_header", the "picture_coding_type" field) may be set, either alone or in combination with altering other values, such as motion blocks or packets.

SELECTED SIGNAL PARAMETERS

In a preferred embodiment, the encoding parameters 112 may comprise the following parameters:

| Encoding Parameters | |
| --- | --- |
| encoding level | degree of further encoding of data stream |
| encoding selection | selection of which encoding functions to apply to data stream |
| pack length | e.g., in packets |
| packet length | e.g., in bits |
| Video Parameters | |
| frame rates for "I", "P" and "B" frames | e.g., relative frequency |
| input frame rate | e.g., in frames per second |
| input picture size | e.g., in lines per frame, pixels per line |
| motion estimation | minimum acceptable match for motion |

| | |
|---|---|
| minimum match | estimation element to determine motion vector |
| motion estimation maximum range | range for motion estimation element to search for target macroblock |
| output frame rate | may differ from input frame rate |
| output picture size | may differ from input picture size |
| quantization scale | precision of DCT coefficients (MPEG II only, always 8 bits in MPEG I) |
| video bit rate | output bit rate for video data (i.e., inverse of compression ratio) |
| Audio Parameters | |
| audio bit rate | output bit rate for audio data (i.e., inverse of compression ratio) |
| audio sampling frequency | 32 KHz, 44.1 KHz (preferred for most contexts), or 48 KHz |
| psychoacoustic model | selection of psychoacoustic model |

DATA FORMAT DESCRIPTION

A data format may be described using a pseudocode structure. Each data structure may be defined by reference to substructures, to conditional values, and to specific constant flag bits. For example, an ISO 11172 data stream may be described as follows:

```
iso11172_stream {
    do {
        pack ( )
    } while (next_bits( ) == pack_start_code)
    iso_11172_end_code                                32 bslbf
}
```

This structure description states that an "iso11172_stream" comprises a sequence of "pack" each one being indicated by starting with the constant "pack_start_code". The iso11172_stream ends with the constant "iso_11172_end_code". The phrase "32 bslbf" indicates that an iso_11172_end_code is 32 bits long and is written as a bit string, left bit first (i.e., the most significant bit is written first).

The following mnemonics are used herein:

| | |
|---|---|
| bslbf | bit string, left bit first (blanks within a bit string have no significance) |
| uimsbf | unsigned integer, most significant bit first (unsigned integers are always positive) |
| simsbf | signed integer, most significant bit first (two's complement form) |
| vlclbf | variable length code, left bit first (in multibyte words, most significant byte first) |

ISO 11172 Data Stream

```
iso11172_stream {
    do {
        pack( )
    } while (next_bits( ) == pack_start_code)
    iso_11132_end_code                                32 bslbf
}
```

Pack

```
pack( ) {
    pack start_code                                   32 bslbf
    0010                                              12 uimsbf
    system_clock_reference[32 . . . 30]               12 uimsbf
    marker_bit                                        4 uimsbf
    system_clock_reference[29 . . . 15]               4 uimsbf
    marker_bit                                        18 uimsbf
    system_clock_reference[14 . . . 0]                1 "1"
    marker_bit                                        10 uimsbf
    marker_bit                                        1
    mux_rate                                          1
```

```
    marker_bit
    if (next_bits( ) == system_header_start_code) {
        system_header
    }
    if (next_bits( ) == pack_start_code_prefix) {
        packet( )
    }
}
```

System Header

```
system_header( ) {
    system_header_start_code                          32 bslbf
    header_length                                     16 uimsbf
    marker_bit                                        1 bslbf
    rate_bound                                        22 uimsbf
    marker_bit                                        1 bslbf
    audio_bound                                       6 uimsbf
    fixed_flag                                        1 bslbf
    CSPS_flag                                         1 uimsbf
    system_audio_lock_flag                            1 bslbf
    system_video_lock_flag                            1 bslbf
    marker_bit                                        1 bslbf
    video_bound                                       5 uimsbf
    reserved_byte                                     8 bslbf
    while (next_bits( ) == 1) {
        stream_id                                     8 uimsbf
        '11'                                          2 bslbf
        STD_buffer_bound_scale                        1 bslbf
        STD_buffer_size_bound                         13 uimsbf
    }
}
```

Packet

```
packet( ) {
    packet_start_code_prefix                          32 bslbf
    stream_id                                         12 uimsbf
    packet_length
    if (packet_start_code != private_stream_2) {
        while (nextbits( ) == '1')
            stuffing_byte
        if (next_bits( ) == '01') {
            '01'
            STD_buffer_scale
            STD_buffer_size
        }
        if (next bits( ) == '0010') {
            '0010'
            presentation_time_stamp[32 . . . 30]
            marker_bit
            presentation_time_stamp[29 . . . 15]
            marker_bit
            presentation_time_[14 . . . 0]
            marker_bit
        }
        else if (next_bits( ) == '0011') {
            '0011'
            presentation_time_stamp[32 . . . 30]
            marker_bit
            presentation_time_stamp[29 . . . 15]
            marker_bit
            presentation_time_stamp[14 . . . 0]
            marker_bit
            '0001'
            presentation_time_stamp[32 . . . 30]
            marker_bit
            presentation_time_stamp[29 . . . 15]
            marker_bit
            presentation_time_stamp[14 . . . 0]
            marker_bit
        }
        else '00001111'
    }
    for (i = 0; i < N; i++) {
        packet_data_byte                              12 uimsbf
    }
}
```

Video Sequence

```
video_sequence( ) {
    next_start_code( )
    do {
```

```
            sequence_header
            do {
                group_of_pictures_headers ( )
            } while (next_bits( ) == group_start_code)
        } while (next_bits( ) == sequence_header_code)
        sequence_end_code                       32 bslbf
    }
Header sequence_headers( ) {
        sequence_header_code                    32 bslbf
        horizontal_size_value                   12 uimsbf
        vertical_size_value                     12 uimsbf
        sample_aspect_ratio                     4 uimsbf
        frame_rate                              4 uimsbf
        bit_rate                                18 uimsbf
        marker_bit                              1 "1"
        vbv_buffer_size                         10 uimsbf
        constrained_parameter_flag              1
        load_intra_quantizer_matrix             1
        if (load_intra_quantizer_matrix)
            intra_quantizer_matrix[64]          8*64 uimsbf
        load_non_intra_quantizer_matrix         1
        if (load_non_intra_quantizer_matrix)
            non_intra_quantizer_matrix[64]      8*64 uimsbf
        next_start_code( )
        if (next_bits( ) != extension_start_code( )) {
            if (next_bits( ) == user_start_code) {
                user_data( )
            }
        }
    }
Group of Pictures Header group_of_pictures_header( ) {
        group_start_code                        32 bslbf
        time_code                               25
        closed_gop                              1
        broken_link                             1
        next_start_code( )
        do {
            picture( )
        } while (next_bits( ) == picture_start_code)
    }
Picture Header picture_header( ) {
        picture_start_code                      32 bslbf
        temporal_reference                      10 uimsbf
        picture_coding_type                     3 uimsbf
        vbv_delay                               16 uimsbf
        if (picture_coding_type == 2
        || picture_coding_type == 3) {
            full_pel_forward_vector             1
            forward_f_code                      3 uimsbf
        }
        if (picture_coding_type == 3) {
            full_pel_backward_vector            1
            backward_f_code                     3 uimsbf
        }
        while (next_bits( ) == '1') {
            extra_bit_picture                   1 "1"
            extra_information_picture           8
        }
        extra_bit_picture                       1 "0"
        next_start_code( )
        do {
            slice( )
        } while (next_bits( ) == slice_start_code)
    }
Slice Header slice( ) {
        slice_start_code                        32 bslbf
        quantizer_scale_code                    5 uimsbf
        while (next bits( ) == '1') {
            extra_bit_slice                     1 "1"
            extra_information_slice             8
        }
        extra_bit_slice                         1 "0"
        do {
            macroblock( )
        } while (next_bits( ) !=
            '000 0000 0000 0000 0000 0000')
        next_start_code( )
    }
Macroblock Layer macroblock( ) {
        while (next_bits( ) == '10000 0001 111')
            macroblock_stuffing                 11 vlclbf
        while (next_bits( ) == '0000 0001 000')
            macroblock_escape                   11 vlclbf
        macroblock_address_increment            1-11 vlclbf
        macroblock type( )                      . . .
        if (macroblock_quant)
            quantizer_scale                     5 uimsbf
        if (macroblock_motion_forward) {
            motion_horizontal_forward_code
            if ((forward_f != 1)
            && (motion_horizontal_forward_code != 0))
                motion_horizontal_forward_r
            motion_horizontal_forward_code
            if ((forward_f != 1)
            && (motion_horizontal_forward_code != 0))
                motion_horizontal_forward_r
        }
        if (macroblock_motion_backward) {
            motion_horizontal_backward_code
            if ((forward_f != 1)
            && (motion_horizontal_forward_code != 0))
                motion_horizontal_backward_r
            motion_horizontal_backward_code
            if ((forward f != 1)
            && (motion_horizontal_forward_code != 0))
                motion_horizontal_backward_r
        }
        if (macroblock_pattern)
            coded_block_pattern( )
        for (i = 0; i < 6; i++) {
            block(i)
        }
        if (picture_coding_type == 4)
            end_of_macroblock                   1 "1"
    }
Block Layer block(i) {
        if (pattern_code[i]) {
            if (macroblock_intra) {
                if (i < 4) {
                    dct_dc_size_luminance       2-9 vlclbf
                    if (dct_dc_size_luminance != 0)
                        dct_dc_differential
                                                1-11 uimsbf
                } else {
                    dct_dc_size_chrominance     2-10 vlclbf
                    if (dtc_dc_size_chrominance != 0)
                        dct_dc_differential
                                                1-11 uimsbf
                }
            } else {
                First DCT coefficient           . . .
            }
            if (picture_coding_type != 4) {
                while (next_bits ( ) != End of block)
                    Subsequent DCT coefficients
                End of block
            }
        }
    }
```

Alternative Embodiments

While preferred embodiments are disclosed herein, many variations are possible which remain within the concept and scope of the invention, and these variations would become clear to one of ordinary skill in the art after perusal of the specification, drawings and claims herein.

We claim:

1. A method of encoding a stream of motion picture data, comprising identifying, in a stream of motion picture data, a set of data relating to a display timing signal for said motion picture data;

altering said data relating to a display timing signal with a first encoding function;

identifying a set of video data and a set of audio data in said motion picture data;

altering said motion picture data so that said video data and said audio data are substantially synchronized;

identifying, in said motion picture data, a set of data relating to a set of frame dimensions and a frame repetition rate for said motion picture data;

altering said data relating to a set of frame dimensions and a frame repetition rate with a second encoding function;

identifying, in said motion picture data, a set of data relating to a broken-link signal relating to a video clip in which a next frame does not present smooth motion from a previous frame; and altering said data relating to a broken-link signal with a third encoding function.

2. A method as in claim 1, comprising receiving a set of encoding parameters associated with said motion picture data;

determining said third encoding function in response to said set of encoding parameters.

3. A method as in claim 1, comprising identifying, in said motion picture data, a set of data relating to a temporal reference and a frame type for a plurality of frames of said motion picture data; and altering said data relating to a temporal reference and a frame type with a fourth encoding function, for a plurality of frames of said motion picture data.

4. A method as in claim 3, comprising receiving a set of encoding parameters associated with said motion picture data;

determining said fourth encoding function in response to said set of encoding parameters.

5. A method as in claim 3, comprising identifying, in said motion picture data, a set of data relating to a motion vector signal for said motion picture data; and altering said data relating to motion vector signal with a fifth encoding function.

6. A method as in claim 5, comprising receiving a set of encoding parameters associated with said motion picture data;

determining said fifth encoding function in response to said set of encoding parameters.

7. A method as in claim 5, comprising identifying, in said motion picture data, a set of data relating to a discrete cosine transform for said motion picture data; and altering said data relating to a discrete cosine transform with a sixth encoding function.

8. A method as in claim 7, comprising receiving a set of encoding parameters associated with said motion picture data;

determining said sixth encoding function in response to said set of encoding parameters.

* * * * *

UNITED STATES PATENT AND TRADEMARK OFFICE
CERTIFICATE OF CORRECTION

PATENT NO. : 5,515,107
DATED : May 7, 1996
INVENTOR(S) : Chen-Huei Chiang and Yan LeComec It is certified that error appears in the above-indentified patent and that said Letters Patent is hereby corrected as shown below:

On the Title page, item [75];

In the section entitled "Identification of the Inventors," replace "LeComec" with --LeCornec--.

Column 5, lines 25 through 30, replace the entire table with the following:

| group | sample frame sequence |
|-------|----------------------|
| 0     | I   P B B P B B . . . P B B |
| 1     | I B B P B B P B B . . . P B B |

Column 6, line 1, replace "macroblack" with --macroblock--.

Column 11, line 11, replace "continue" with --continues--.

Column 11, line 16, replace "continue" with --continues--.

Column 12, line 1, replace "value value" with --value--.

Column 12, line 32, replace " the" with --, the--.

Column 14, line 43, replace "presentation_time_" with --presentation_time_stamp--.

Column 15, line 3, replace "group_of_pictures_headers" with --group_of_pictures_header--.

Column 15, line 7, replace "Header" with --Sequence Header--.

UNITED STATES PATENT AND TRADEMARK OFFICE
CERTIFICATE OF CORRECTION

PATENT NO. : 5,515,107
DATED : May 7, 1996
INVENTOR(S) : Chen-Huei Chiang and Yan LeCornec It is certified that error appears in the above-indentified patent and that said Letters Patent is hereby corrected as shown below:

Column 15, line 9, replace "sequence_headers" with --sequence_header--.

Column 16, line 10, replace "10000 0001 111" with --0000 0001 111--.

Column 16, line 29, replace "forward f" with --forward_f--.

Column 16, line 49, replace "dtc" with --dct--.

Signed and Sealed this

Twenty-first Day of January, 1997

Attest:

BRUCE LEHMAN

Attesting Officer   Commissioner of Patents and Trademarks